(12) United States Patent
Kawato et al.

(10) Patent No.: US 7,767,780 B2
(45) Date of Patent: *Aug. 3, 2010

(54) LIGHT-DIFFUSING POLYCARBONATE RESIN COMPOSITION AND LIGHT DIFFUSER PLATE COMPRISING THE RESIN COMPOSITION

(75) Inventors: Hiroshi Kawato, Chiba (JP); Masami Kogure, Chiba (JP); Yoshihiko Horio, Chiba (JP); Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 11/994,031

(22) PCT Filed: Jun. 22, 2006

(86) PCT No.: PCT/JP2006/312516

§ 371 (c)(1),
(2), (4) Date: Dec. 27, 2007

(87) PCT Pub. No.: WO2007/004434

PCT Pub. Date: Jan. 11, 2007

(65) Prior Publication Data

US 2009/0093583 A1   Apr. 9, 2009

(30) Foreign Application Priority Data

Jul. 5, 2005   (JP) .............................. 2005-196852

(51) Int. Cl.
*C08G 64/00* (2006.01)
*C08G 63/02* (2006.01)

(52) U.S. Cl. ...................... 528/196; 252/589; 359/599; 524/502; 524/537; 524/611

(58) Field of Classification Search ................. 252/589; 359/599; 524/502, 537, 611
See application file for complete search history.

(56) References Cited

U.S. PATENT DOCUMENTS

| | | | | |
|---|---|---|---|---|
| 5,773,134 | A * | 6/1998 | Inokuchi et al. | 428/220 |
| 6,556,347 | B1 * | 4/2003 | Murayama et al. | 359/453 |
| 2008/0287610 | A1 * | 11/2008 | Ishikawa et al. | 525/391 |
| 2008/0300378 | A1 * | 12/2008 | Suga et al. | 528/195 |
| 2009/0080079 | A1 * | 3/2009 | Kogure et al. | 359/599 |
| 2009/0116115 | A1 * | 5/2009 | Kogure et al. | 359/599 |

FOREIGN PATENT DOCUMENTS

| | | | |
|---|---|---|---|
| JP | 05 339359 | | 12/1993 |
| JP | 10 046018 | | 2/1998 |
| JP | 2005 247947 | | 9/2005 |
| JP | 2006016497 | * | 1/2006 |

OTHER PUBLICATIONS

U.S. Appl. No. 12/305,207, filed Dec. 17, 2008, Kogure, et al.
U.S. Appl. No. 12/299,216, filed Oct. 31, 2008, Ishikawa, et al.
U.S. Appl. No. 12/299,121, filed Oct. 31, 2008, Ishikawa.
U.S. Appl. No. 12/297,786, filed Oct. 20, 2008, Ishikawa.
U.S. Appl. No. 11/913,181, filed Oct. 31, 2007, Kogure, et al.
U.S. Appl. No. 11/577,723, filed Apr. 23, 2007, Kogure, et al.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

The present invention provides a light diffusing polycarbonate resin composition including a polycarbonate resin containing a polycarbonate copolymer which comprises a repeating unit represented by the general formula (I) shown below and a repeating unit represented by the general formula (II) shown below, which has a content of the repeating units of the general formula (II) of 1 to 30% by mass and which has a viscosity value of 30 to 71, and (B) a light diffusing agent compounded therein in an amount of 0.01 to 10 parts by mass per 100 parts by mass of the polycarbonate resin. The light diffusing polycarbonate resin composition and a light diffusing plate thereof show improved fluidity during molding and have excellent heat resistance, dimensional stability, luminance and color tone.

13 Claims, No Drawings

LIGHT-DIFFUSING POLYCARBONATE RESIN COMPOSITION AND LIGHT DIFFUSER PLATE COMPRISING THE RESIN COMPOSITION

CROSS-REFERENCE TO RELATED APPLICATIONS

The present application is a 35 U.S.C. §371 National Stage patent application of International patent application PCT/JP2006/312516, filed on Jun. 22, 2006, which claims priority to Japanese patent application JP 2005-196852, filed on Jul. 5, 2005.

TECHNICAL FIELD

The present invention relates to a light diffusing polycarbonate resin composition suitable for forming light diffusing plates used in the field of liquid crystal displays; optical elements such as optical lenses, light guide plates (light guides) and light diffusing plates; and glass substitutes for use in street lamp covers, vehicles and construction materials, and to a light diffusing plate using the resin composition.

BACKGROUND ART

In recent years, the application of liquid crystal displays (LCD) has widened to include not only notebook personal computers (PC) and monitors but also television sets (TV). For a light diffusing plate (1 mm to 3 mm thick) for a direct-underlying-type backlight mounted on TV in which brightness is particularly requested, an acrylic resin is generally used when the screen size is around 20 inches.

However, acrylic resins have poor dimensional stability because of their poor heat resistance and high hygroscopicity, so that light diffusing plates of large screen size have a problem of warp-deformation.

Therefore, polycarbonate resins (hereinafter occasionally referred to as PC for brevity), which are superior in heat resistance and anti-hygroscopicity as compared with acrylic resins, are used nowadays as matrix resins for light diffusing plates. Thus, the demand for such polycarbonate resins is increasing.

A composition obtained by compounding a light diffusing agent in an ordinary polycarbonate resin as a transparent resin is publicly known (see, for example, Patent Document 1).

Whilst a light diffusing plate disclosed in Patent Document 1 is superior in heat resistance, impact strength and hygroscopicity in comparison with a light diffusing plate of an acrylic resin, however, the transparency thereof is inferior to the acrylic resin. Therefore, the light diffusing plate of Patent Document 1 has a problem because when a light diffusing agent is compounded in the polycarbonate resin, the diffused light after light diffusion shows a yellowish color tone and a lowered brightness.

Further, when the polycarbonate resin is used for the production of light diffusing plates for large screen TVs by injection molding, the light diffusing plates have unavoidably a residual strain due to insufficient fluidity of the polycarbonate resin so that a warp of the light diffusing plates is caused by the heat emitted from the light source even when the plates are used in a backlight system. Furthermore, there is a problem because the diffusing plates are colored yellow by UV lights emitted from the light source.

That is, there is a need in the known light diffusing polycarbonate resin to improve its light diffusing characteristics, fluidity during molding and light resisting properties.

Patent document 1: Japanese Unexamined Patent Application Publication No. H10-46018

DISCLOSURE OF THE INVENTION

The present invention has been made for solving the above-described problems of the prior art and has as its object the provision of a light diffusing polycarbonate resin composition and a light diffusing plate thereof which show improved fluidity during molding and have excellent heat resistance, dimensional stability, luminance and color tone.

The present inventors have made an earnest study with a view toward accomplishing the above objects and, as a result, have found that, by compounding a light diffusing agent in an aromatic polycarbonate resin containing a specific polycarbonate copolymer, the fluidity of the resulting polycarbonate resin composition can be improved and the above problem can be solved.

Thus, in accordance with the present invention, there are provided:

(1) a light diffusing polycarbonate resin composition comprising (A) a polycarbonate resin containing a polycarbonate copolymer which comprises a repeating unit represented by the general formula (I) shown below and a repeating unit represented by the general formula (II) shown below, which has a content of the repeating units of the general formula (II) of 1 to 30% by mass and which has a viscosity value of 30 to 71, and (B) a light diffusing agent compounded therein in an amount of 0.01 to 10 parts by mass per 100 parts by mass of the polycarbonate resin.

[Chemical Formula 1]

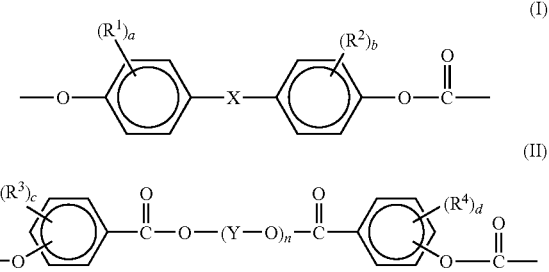

wherein $R^1$ and $R^2$ each independently represent an alkyl group having 1 to 6 carbon atoms, X represents a direct bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a linkage represented by the following formula (III-1) or (III-2):

[Chemical Formula 2]

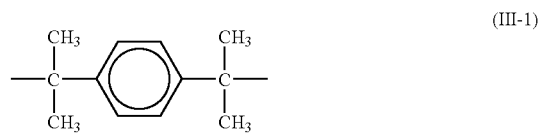

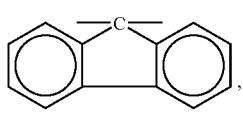
(III-2)

$R^3$ and $R^4$ each independently represent an alkyl group having 1 to 3 carbon atoms, Y represents a straight chained or branched chained alkylene group having 2 to 15 carbon atoms, n is an integer of 2 to 200 and a, b, c and d are each an integer of 0 to 4; and (2) a light diffusing plate having a thickness of 0.5 to 3 mm is obtainable by molding a light diffusing polycarbonate resin composition as recited in (1) above.

BEST MODE FOR CARRYING OUT THE INVENTION

The composition according to the present invention shows improved fluidity at the time of molding because the composition comprises, as a component (A), an aromatic polycarbonate resin containing a polycarbonate copolymer which contains a repeating unit represented by the general formula (I) and a repeating unit represented by the general formula (II), which has a content of the repeating units of the general formula (II) of 1 to 30% by mass, preferably 5 to 20% by mass, and which has a viscosity value of 30 to 71.

The above polycarbonate copolymer is a copolycarbonate containing phenol-modified diol units and may be produced by a known method called interfacial polymerization. Namely, the polycarbonate copolymer may be produced by reaction of a dihydric phenol with a phenol-modified diol and a carbonate precursor such as phosgene. To be more specific, the polycarbonate copolymer may be produced by, for example, reacting a dihydric phenol with a phenol-modified diol and a carbonate precursor such as phosgene in an inert solvent such as methylene chloride in the presence of a known acid acceptor, a known molecular weight controlling agent and, if necessary, a catalyst and/or a branching agent.

The polycarbonate copolymer comprises a repeating unit represented by the general formula (I) shown below and a repeating unit represented by the general formula (II) shown below:

[Chemical Formula 3]

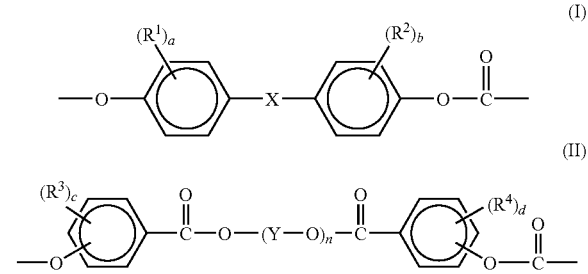

The symbols $R^3$ to $R^4$, X, Y, a to d and n in the above formulas will be explained hereinafter.

As the dihydric phenol, there may be mentioned a compound represented by the following general formula (Ia):

[Chemical Formula 4]

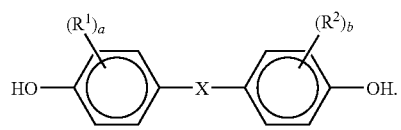

In the general formula (1a), $R^1$ and $R^2$ each independently represent an alkyl group having 1 to 6 carbon atoms which may be straight chained, branched or cyclic. Specific examples of the alkyl group include a methyl group, an ethyl group, a n-propyl group, an isopropyl group, a n-butyl group, an isobutyl group, a tert-butyl group, a n-pentyl group, an isopentyl group, a n-hexyl group, an isohexyl group, a cyclopentyl group and a cyclohexyl group. The symbols a and b each indicate the number of substituents and are each an integer of 0 to 4. When there are a plurality of $R^1$ groups, they may be the same with or different from each other. When there are a plurality of $R^2$ groups, they may be the same with or different from each other.

The symbol X represents a direct bond, an alkylene group having 1 to 8 carbon atoms (such as a methylene group, an ethylene group, a propylene group, a butylene group, a pentylene group or a hexylene group), or an alkylidene group having 2 to 8 carbon atoms (such as an ethylidene group or an isopropylidene group), a cycloalkylene having 5 to 15 carbon atoms (such as a cyclopentylene group or a cyclohexylene group) or cycloalkylidene group having 5 to 15 carbon atoms (such as a cyclopentylidene group or a cyclohexylidene group), a bond of —S—, —SO—, —SO$_2$—, —O— or —CO—, or a bond of the following formula (III-1) or formula (III-2):

[Chemical Formula 5]

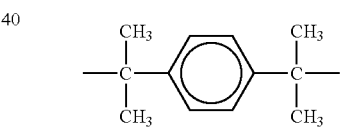
(III-1)

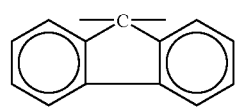
(III-2)

As the dihydric phenol represented by the general formula (Ia), various phenol compounds may be mentioned. Particularly preferred is 2,2-bis(4-hydroxyphenyl)propane (commonly called as bisphenol A). Examples of the bisphenol other than bisphenol A include bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(hydroxyphenyl)phenylmethane, 2,2-bis(4-hydroxy-1-methylphenyl)propane; bis(4-hydroxyphenyl)naphthyl methane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenylsulfone, dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane and 1,3-bis(4-hydroxyphenyl)-5,7-dimethyladamantane; bis(4-hydroxyphenyl)diphenylmethane, 4,4'-[1,3-phenylenebis(1-methylethylidene)]bisphenol, 10,10-bis(4-hydroxyphenyl)-9-anthrone, 1,5-bis(4-hydroxyphenylthio)-2,3-dioxapentaene, and α,ω-bishydroxyphenylpolydimethylsiloxane compounds. These dihydric phenol compounds may be used singly or as a mixture of two or more thereof.

Any molecular weight controlling agent customarily employed for producing polycarbonate resins may be used. Specific examples of the monohydric phenol include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkyl phenols having a linear or branched chain alkyl group with an average carbon atom number of 12 to 35 at ortho-, meta-, or para-position, 9-(4-hydroxyphenyl)-9-(4-methoxyphenyl)fluorine, 9-(4-hydroxy-3-methylphenyl)-9-(4-methoxy-3-methylphenyl)fluorine and 4-(1-adamantyl)phenol. Among the above monohydric phenols, p-t-butylphenol, p-cumylphenol, p-phenylphenol, etc. are preferably used.

As the catalyst, a phase transfer catalyst such as a tertiary amine or its salt, a quaternary ammonium salt or a quaternary phosphonium salt may be preferably used. As the tertiary amine, there may be mentioned, for example, triethylamine, tributylamine, N,N-dimethylcyclohexylamine, pyridine and dimethylaniline. Examples of the tertiary amine salt include hydrochloric acid salts and bromic acid salts of the above tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride and tetrabutylammonium bromide. Examples of the quaternary phosphonium salt include tetrabutylphosphonium chloride and tetrabutylphosphonium bromide. These catalysts may be used singly or in combination of two or more thereof. Above all, a tertiary amine is preferred and triethylamine is particularly preferred.

Various kinds of inert organic solvents may be used. Examples of the organic solvent include chlorinated hydrocarbons such as dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene, toluene and acetophenone. These organic solvents may be used singly or in combination of two or more thereof. Above all, methylene chloride is particularly preferred.

As the branching agent, there may be used, for example, compounds having 3 or more functional groups such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, 4,4'-[1-[4-[1-(4-hydroxyphenyl)-1-methylethyl]phenyl]ethylidene]bisphenol, phloroglycine, trimellitic acid and isatinbis(o-cresol), and compounds having 3 or more functional groups such as phloroglycine, trimellitic acid and isatinbis(o-cresol).

The phenol-modified diol used in the present invention is a compound represented by the following general formula:

[Chemical Formula 6]

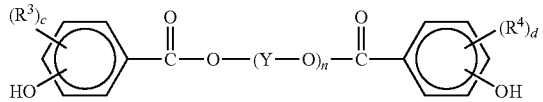

(IIa)

wherein $R^3$ and $R^4$ each independently represent an alkyl group having 1 to 3 carbon atoms, Y represents a straight chained or branched chained alkylene group having 2 to 15 carbon atoms, c and d are each an integer of 0 to 4 and n is an integer of 2 to 200.

As the alkyl group represented by $R^3$ or $R^4$, there may be mentioned a methyl group, an ethyl group, a n-propyl group or an isopropyl group. When there are a plurality of $R^3$ groups, they may be the same as or different from each other. When there are a plurality of $R^4$ groups, they may be the same as or different from each other. As the straight chained or branched alkylene group having 2 to 15 carbon atoms represented by Y, there may be mentioned an alkylene group such as an ethylene group, a propylene group, a butylene group, an isobutylene group, a pentylene group and an isopentylene group, and an alkylidene group such as an ethylidene group, a propylidene group, an isopropylidene group, a butylidene group, an isobutylidene group, a pentylidene group and an isopentylidene group. The integer n is preferably 2 to 200, more preferably 6 to 70.

The phenol-modified diol represented by the above general formula (IIa) is a compound derived from a hydroxybenzoic acid or its alkyl ester or acid chloride and a polyether diol and may be synthesized by methods disclosed in Japanese Unexamined Patent Application Publications No. S62-79222, No. S60-79072 and No. 2002-173465. The phenol-modified diol obtained by such methods is desirably suitably purified. Purification may be carried out by, for example, a method in which the reaction system in the later stage of the reaction is maintained in a reduced pressure to distill excess raw materials (such as p-hydroxybenzoic acid), or a method in which the crude phenol-modified diol is washed with water or an alkaline aqueous solution (for example an aqueous sodium hydrogen carbonate solution).

Representative examples of the alkyl ester of a hydroxybenzoic acid include a methyl ester of a hydroxybenzoic acid and an ethyl ester of a hydroxybenzoic acid. The polyether diol is represented by HO—(Y—O)$_n$—H (wherein Y and n are the same as defined previously) and has a repeating unit of a straight chained or branched oxyalkylene group having 2 to 15 carbon atoms. Specific examples of the polyether diol include polyethylene glycol, polypropylene glycol and polytetramethylene glycol. From the standpoint of availability and hydrophobicity, polytetramethylene glycol is particularly preferred. The repeating number n of the oxyalkylene group of the polyether diol is 2 to 200, preferably 6 to 70. When n is 2 or more, the copolymerization of the phenol-modified diol may be carried out in an efficient manner. When n is not more than 70, a merit that a reduction in heat resistance of the PC copolymer obtained can be minimized.

A representative example of the acid chloride is one obtained from a hydroxybenzoic acid and phosgene. To be more specific, the acid chloride may be obtained by a method disclosed in Japanese Patent No. 2,652,707. In this case, the hydroxybenzoic acid or its alkyl ester may be a para, metha or ortho form. For reasons of copolymerization efficiency, a para form is referred. There is a possibility that the copolymerization reactivity is lowered in the case of an ortho form due to the steric hindrance on the hydroxyl group.

In the production of the PC copolymer, it is preferred that the phenol-modified diol be used in the form of a methylene chloride solution for the purpose of preventing the denaturation thereof. When it is not possible to use the phenol-modified diol in the form of a methylene chloride solution, the phenol-modified diol is desired to be used in the form of an aqueous alkaline solution such as an aqueous NaOH solution.

While the fluidity of the PC copolymer is improved by increasing the content of the phenol-modified diol units, the heat resistance thereof is reduced. Therefore, it is preferred that the content of the phenol-modified diol units in the copolymer be selected so as to attain the desired balance of fluidity and heat resistance. When the content of the phenol-modified diol units is excessively high, the resulting copolymer is in the form of an elastomer as described in Japanese Unexamined Patent Application Publication No. S62-79222 and, therefore, may not be able to be used for the same applications as the ordinary PC resins. In order to attain heat resistance at 100° C. or higher, the amount of the phenol-modified diol units contained in the PC copolymer is preferably 1 to 30% by mass, more preferably 1 to 20% by mass, still more preferably 1 to 15% by mass.

The PC copolymer used as component (A) in the present invention preferably has a viscosity value of 30 to 71 (which corresponds to Mv (viscosity average molecular weight) of 10,000 to 28,100), more preferably 37 to 62 (which corresponds to Mv of 13,100 to 24,100). A viscosity value of 30 or more can provide good mechanical strength. When the viscosity value is 71 or less, the desired effect of the comonomer of the copolymer is obtained in a satisfactory manner. A large amount of the comonomer must be used in order to obtain high fluidity. As long as the viscosity number is 71 or less, however, the heat resistance is not greatly reduced even when the comonomer is used in a large amount. As used herein the viscosity number is as measured in accordance with ISO 1628-4 (1999).

The above polycarbonate copolymer may be used by itself as the aromatic polycarbonate resin being the component (A) used in the present invention. However, the polycarbonate copolymer may be used in the form of a mixture with another aromatic polycarbonate resin.

As the "another aromatic polycarbonate resin" used in the component (A) of the light diffusing polycarbonate resin composition of the present invention, there may be mentioned aromatic polycarbonate resins produced by conventional methods, that is, those generally produced by reacting a dihydric phenol with a carbonate precursor such as phosgene or a carbonic acid ester compound. More specifically, the aromatic polycarbonate resin may be produced, for example, by reaction of a dihydric phenol with a carbonate precursor such as phosgene in a solvent such as methylene chloride in the presence of a known acid acceptor and a known molecular weight controlling agent and, if desired, in a further presence of a branching agent, or by transesterification of a dihydric phenol with a carbonate precursor such as diphenyl carbonate.

A variety of dihydric phenols may be mentioned as the dihydric phenol, but 2,2-bis(4-hydroxyphenyl)propane (generally called bisphenol A) is particularly preferred. As bisphenols other than bisphenol A, there may be used, for example, those described above in connection with the polycarbonate copolymer.

As the carbonic ester compound, there may be mentioned, for example, diaryl carbonates such as diphenyl carbonate and dialkyl carbonates such as dimethyl carbonate and diethyl carbonate. As the molecular weight controlling agent, various kinds of controlling agents generally used for the production of polycarbonates may be used. Examples of the controlling agent include monohydric phenols such as phenol, o-n-butylphenol, m-n-butylphenol, p-n-butyl phenol and other monohydric phenols exemplified above in connection with the polycarbonate copolymer. Among the monohydric phenols, p-t-butylphenol, p-cumylphenol and p-phenylphenol are preferably used.

As the branching agent, there may be used compounds having 3 or more functional groups such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglycine, trimellitic acid and isatinbis(o-cresol), as in the case of the above-described polycarbonate copolymer.

Generally, the viscosity average molecular weight of the aromatic polycarbonate resin used in the present invention is preferably 10,000 to 100,000, more preferably 15,000 to 40,000.

As the "another aromatic polycarbonate resin", those aromatic polycarbonate resins which are described above or those which are commercially available may be used. The mixing ratio of the polycarbonate copolymer to the "another aromatic polycarbonate resin" is preferably 1:99 to 10:90, more preferably 5:95 to 50:50 in terms of mass ratio.

The light diffusing agent used as the component (B) is a solid which is optically transparent and which has a refractive index different from the aromatic polycarbonate resin used as the component (A). It is preferred that the difference (in absolute value) in refractive index between the component (A) and component (B) be in the range of 0.02 to 0.2. When the difference in refractive index is in the above range, it is possible to obtain both high levels of light diffusion and light transmittance. The light diffusing agent may be polymer fine particles or inorganic fine particles. A single kind of such fine particles may be used or two or more kinds of such fine particles may be used in combination. In either case, the average particle diameter is preferably about 0.1 to 200 µm.

As used herein, the average particle diameter is intended to refer to D50 value in case the cumulative distribution percentage as measured by laser light scattering method reaches 50%. Fine particles having a narrow particle diameter distribution are preferably used. In the present invention, polymer fine particles are suitably used as the component (B). The use of such polymer fine particles can realize light diffusing functions in which both light diffusion effect and total light transmittance are obtainable at high levels.

It is preferred that the polymer fine particles used as the component (B) be spherical from the standpoint of light diffusion. The nearer to perfect spheres are the polymer fine particles, the better. The polymer fine particles may be organic cross-linked particles obtainable by the polymerization of a non-cross-linkable monomer and a cross-linkable monomer. As the non-cross-linkable monomer, there may be mentioned a non-cross-linkable vinyl monomer, such as an acrylic monomer, a styrenic monomer or an acrylonitrilic monomer, and an olefinic monomer. These monomers may be used singly or as a mixture of two or more thereof. Other copolymerizable monomers than the above monomers may be also used. Other organic cross-linked particles such as silicone-based cross-linked particles may be also used.

Specific examples of the light diffusing agent include acrylic beads, silica beads and silicone resin beads.

As the polymeric fine particles, amorphous heat resisting polymer particles, such as particles of polyethersulfone, various epoxy resin particles, melamine resin particles, benzoguanamine resin particles, phenol resin particles, etc. may be also used.

Specific-examples of the polymer fine particles used as the light diffusing agent include organic cross-linked particles. The acrylic monomer used as the non-cross-linkable vinyl monomer from which such organic cross-linked particles are formed may be, for example, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate or phenyl methacrylate. These acrylic monomers may be used alone or as a mixture of two or more thereof. Above all, methyl methacrylate is particularly preferred. The styrenic monomer may be, for example, an alkylstyrene such as styrene, α-methylstyrene, methylstyrene (vinyl toluene) or ethylstyrene, or a halogenated styrene such as brominated styrene. Above all, styrene is particularly preferred. The acrylonitrilic monomer may be, for example, acrylonitrile or methacrylonitrile. The olefinic monomer may be, for example, ethylene or a norbornene-type compound. The other copolymerizable monomer may be, for example, glycidyl methacrylate, N-methylmaleimide or maleic anhydride. Thus, the polymer fine particles can contain N-methylglutarimide units.

On the other hand, the light diffusing agent of inorganic fine particles may be, for example, a glass filler, calcium carbonate, barium sulfate, silica, talc, mica and wallastonite. An example of the particularly preferable light diffusing agent is calcium carbonate. The shape of the inorganic fine particles is not specifically limited. However, a granular (including an indeterminate shape) or platy form is more suitable than a fibrous form. Examples of the glass filler include glass beads, glass balloons, glass milled fibers, glass flakes, extremely thin glass flakes (produced by sol-gel method) and indeterminate shape glass. The other inorganic fine particles may be also in the above exemplified shapes. The above-described inorganic fine particles may be those which have been surface treated with a silicone compound, such as a silane coupling agent or a polyorganohydrogensiloxane compound, an aliphatic ester compound or an olefin compound. Such a surface treatment of the inorganic fine particles is effective to improve the thermal stability and resistance to hydrolysis. Titanium oxide, which has a high light diffusing power and significantly reduces the light transmittance, is not suited for the purpose of the present invention.

Among the above-described inorganic fine particles, glass beads, and hollow beads, indeterminate-shaped powder or platy powder of a material similar to such glass beads are generally used.

The acrylic beads preferably have an average particle diameter of about 0.2 to 20 μm. The silica beads preferably have an average particle diameter of about 2 to 20 μm and are particularly preferably high purity synthetic silica beads which are nearly perfectly spherical in shape and have an average particle diameter of about 2 to 5 μm. The silicone resin beads preferably have an average particle diameter of about 0.5 to 20 μm.

As the glass beads, although various kinds of glass beads made of, for example, low alkali glass (E glass) and high refractive index glass (having a refractive index of 1.9 to 2.2) can be used, E glass beads having an average particle diameter of 1 to 50 μm are preferably used for reasons of inexpensiveness. Regardless of the kind of the beads, it is preferred that the beads be of a monodisperse type and be nearly perfect spheres having a retroreflective function.

It is particularly preferred that the light diffusing agent be silica beads, glass beads or an indeterminate-shaped powder of a crystalline substance having excellent light diffusing properties (particularly crystalline silica powder) for reasons of easiness in obtaining a light diffusing polycarbonate resin composition having excellent transparency (YI).

The thermoplastic acrylic resin (component (C)) optionally used in the present invention refers to a polymer containing, as a repeating unit, at least one monomer unit selected from acrylic acid, an acrylate ester, acrylonitrile and derivatives thereof, and may be a homopolymer or a copolymer with styrene, butadiene or the like comonomer. To be more specific, the thermoplastic acrylic resin may be, for example, polyacrylic acid, polymethyl methacrylate (PMMA), polyacrylonitrile, a copolymer of ethyl acrylate with 2-chloroethyl acrylate, a copolymer of n-butyl acrylate with acrylonitrile, a copolymer of acrylonitrile with styrene, a copolymer of acrylonitrile with butadiene, and a terpolymer of acrylonitrile, butadiene and styrene. Of these, polymethyl methacrylate (PMMA) is particularly suitably used.

Publicly known polymethyl methacrylate (PMMA) may be used. Such polymethyl methacrylate may be generally produced by bulk polymerization of a methyl methacrylate monomer in the presence of a peroxide and an azo-type initiator. It is preferred that the polymethyl methacrylate have a molecular weight of 1000 to 200,000 from the standpoint of its compatibility with the aromatic polycarbonate resin which is the component (A) used as a base resin matrix.

The compounding amount of the thermoplastic acrylic resin is generally 0.001 to 1 part by mass, preferably 0.005 to 0.5 part by mass, per 100 parts by mass of the aromatic polycarbonate resin of the component (A). When the compounding amount of the thermoplastic acrylic resin is 0.001 part by mass or more, the light diffusing aromatic polycarbonate resin composition having good light guiding properties and good brightness can be obtained. When the blending amount is 1 part by mass or less, the acrylic resin component does not cause phase separation and clouding and, therefore, the light diffusing aromatic polycarbonate resin composition having good light guiding properties and good brightness can be obtained.

A phosphorus-based stabilizer may be incorporated into the light diffusing polycarbonate resin composition of the present invention as component (D), if necessary. The phosphorus-based stabilizer serves to improve not only the heat stability of the composition during fabrication or during molding but also the mechanical characteristics, color tone and molding stability thereof.

As the phosphorus-based stabilizer, there may be mentioned phosphorus acid compounds and/or aromatic phosphine compounds.

As the phosphorus acid compound, there may be mentioned phosphorous acid, phosphoric acid, phosphonous acid, phosphonic acid and esters thereof. Specific examples of the phosphorus acid compound include triphenyl phosphite, tris (nonylphenyl) phosphite, tris(2,4-di-tert-butylphenyl) phosphite, tridecyl phosphite, trioctyl phosphite, trioctadecyl phosphite, didecyl monophenyl phosphite, dioctylmonophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylenebis(4,6-di-tert-butylphenyl) octyl phosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, tetrakis(2,4-di-tert-butylphenyl) 4,4'-biphenylenediphosphonate, dimethyl benzenephosphonate, diethyl benzenephosphonate and dipropyl benzenephosphonate.

Above all, tris(nonylphenyl) phosphite, trimethyl phosphate, tris(2,4-di-tert-butylphenyl) phosphite and dimethyl benzenephosphonate are preferred.

As the aromatic phosphine compound, there may be mentioned arylphosphine compounds represented by general formula (IV):

[Chemical Formula 7]

$$P\text{-}(X)_3 \quad (IV)$$

In the above formula (IV), X represents a hydrocarbon group with the proviso that at least one of the X groups is an aryl group having 6 to 18 carbon atoms and having a substituent or substituents.

As the arylphosphine compound of the general formula (IV), there may be mentioned, for example, triphenylphosphine, diphenylbutylphosphine, diphenyloctadecylphosphine, tris(p-tolyl)phosphine, tris(p-nonylphenyl)phosphine, tris(naphthyl)phosphine, diphenyl(hydroxymethyl)phosphine, diphenyl(acetoxymethyl)phosphine, diphenyl(β-ethylcarboxyethyl)phosphine, tris(p-chlorophenyl)phosphine, tris(p-fluorophenyl)phosphine, diphenylbenzylphosphine, diphenyl-β-cyanoethylphosphine, diphenyl(p-hydroxyphenyl)phosphine, diphenyl(1,4-dihydroxyphenyl)-2-phosphine and phenylnaphthylbenzylphosphine.

Above all, triphenylphosphine is particularly preferably used.

The above-described phosphorous-based stabilizers may be used singly or in combination of two or more thereof.

The compounding amount of the phosphorous-based stabilizer used in the present invention is generally 0.001 to 1 part by mass, preferably 0.005 to 0.5 part by mass, more preferably 0.01 to 0.1 part by mass, per 100 parts by mass of the aromatic polycarbonate resin.

When the compounding amount of the phosphorous-based stabilizer is within the above range, the heat stability during the molding is improved.

An organopolysiloxane may be compounded into the composition of the present invention, if necessary, as component (E).

The organopolysiloxane used in the present invention is preferably a reactive silicone-based compound (such as organosiloxane) containing at least one group selected from an alkoxy group, a vinyl group and a phenyl group. Such a reactive silicone-based compound may be, for example, a silicone-based compound into which at least one group selected from a methoxy group, a vinyl group and a phenyl group is introduced.

The component (E) has an effect of further improving the heat stability during the molding and, in particular, is effective for the prevention of appearance defects (yellow coloring and silver (silver streaks)) and inclusion of air bubbles due to thermal degradation during the molding.

The compounding amount of the component (E) is properly selected from a range of 0.01 to 1 part by mass per 100 parts by mass of the aromatic polycarbonate resin of the component (A).

When the compounding amount is 0.01 part by mass or more, the heat stability improving effect can be obtained in a satisfactory manner.

An amount of component (E) below 1 part by mass does not cause clouding of the molded products.

A UV absorbing agent may be incorporated into the light diffusing polycarbonate resin composition of the present invention as component (F), if necessary. The UV absorbing agent may be a compound showing a UV absorption spectrum having a maximum absorption wavelength of 290 to 330 nm. Such a UV absorbing agent is preferably selected from malonic acid ester compounds, oxalyl anilide compounds and benzotriazole compounds. These compounds may be used singly or in combination of two or more thereof.

As the malonic acid ester compound, there may be mentioned benzylidene bis(diethyl malonate) and 4-methoxyphenyl-methylene-dimethyl ester. As the oxalyl anilide compound, there may be mentioned those hydrocarbon group having 1 to 12 carbon atoms. The benzotriazole compound is preferably an acrylic polymer having a side chain with a benzotriazole skeleton. An example of such a benzotriazole compound is polymethyl methacrylate (PMMA) having a side chain to which a 2-(5-t-octyl-2-hydroxyphenyl)benzotriazole group is bonded.

The compounding amount of the UV absorbing agent of the component (F) is preferably 0.05 to 5 part by mass, more preferably 0.1 to 3 parts by mass, per 100 parts by mass of the aromatic polycarbonate resin of the component (A). When the compounding amount is 0.05 part by mass or more, good light resisting property is obtainable. When the compounding amount is 5 parts by mass or less, a reduction of color tone in an initial stage can be suppressed.

An alicyclic epoxy compound may be compounded as component (G) in the composition of the present invention, if necessary, for the purpose of improving resistance to steam (resistance to hydrolysis).

The alicyclic epoxy compound of the component (G) used in the present invention refers to a cyclic aliphatic compound having an alicyclic epoxy group, that is, an epoxy group in which one oxygen atom is added to an ethylenic bond of an aliphatic ring. Specifically, compounds represented by the formulas (V) to (XIV) shown below are preferably used.

[Chemical Formula 8]

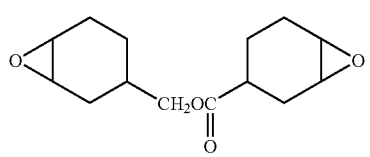

(V)

[Chemical Formula 9]

(VI)

=CH2 with epoxycyclohexyl)

(R: H or CH₃)
[Chemical Formula 10]

(VII)

5OCC(R)=CH2 with epoxycyclohexyl)

(R: H or CH₃)
[Chemical Formula 11]

(VIII)

[Chemical Formula 12]

(IX)

![structure with CO[O(CH2)5CO]aOCH2 and CO[O(CH2)5CO]bOCH2]

(a + b = 1 or 2)
[Chemical Formula 13]

(X)

![structure with four arms CH2CO[O(CH2)5CO]aOCH2, CH—CO[O(CH2)5CO]bOCH2, CH—CO[O(CH2)5CO]cOCH2, CH2CO[O(CH2)5CO]dOCH2]

(a + b + c + d = 1 to 3)
[Chemical Formula 14]

(XI)

![structure with three branches a, b, c]

(a + b + c = n (integer), R: hydrocarbon group)
[Chemical Formula 9]

(XII)

![structure with CH2O[C(CH2)5O]nC between two epoxycyclohexyl groups]

(n: integer)
[Chemical Formula 16]

(XIII)

![structure with R substituents on epoxycyclohexyl and oxirane]

(R: hydrocarbon group)
[Chemical Formula 17]

(XIV)

![structure R—O—[...]n—O—H]

(n: integer, R: hydrocarbon group)

Among the above aliphatic epoxy compounds, the compounds represented by formula (V), formula (X) and formula (XIV) are preferably used because of their excellent compatibility with the aromatic polycarbonate resin and of freedom from impairing transparency.

By being compounded with the alicyclic epoxy compound of the component (G), the resin composition of the present invention shows improved transparency and improved steam resistance (resistance to hydrolysis).

The compounding amount of the alicyclic epoxy compound is 0.01 to 1 part by mass, preferably 0.02 to 0.2 part by mass, per 100 parts by mass of the aromatic polycarbonate resin.

A compounding amount of the alicyclic epoxy compound of 0.01 part by mass or more can improve the transparency and steam resistance. When the compounding amount is 1 part by mass or less, no phase separation occurs while ensuring good transparency.

Other than the foregoing components, various additives may be compounded in the light diffusing polycarbonate resin composition of the present invention. Such additives may be, for example, an antioxidant such as a hindered phenol-type antioxidant or an ester-type antioxidant, a light stabilizing agent such as a hindered amine-type stabilizer, and other commonly employed agents such as a flame retarding agent, a flame retardant aid, a mold releasing agent and a coloring agent.

The light diffusing polycarbonate resin composition of the present invention may be produced by blending the above-described components and, if necessary, by melting and kneading the blend. The customarily employed method can be adopted for the blending, melting and kneading. For example, blending and kneading can be performed with a ribbon blender, a Henschel mixer, a Banbury mixer, a drum tumbler, a single-screw extruder, a twin-screw extruder, a coknneader or a multi-screw extruder.

The melting and kneading may be suitably carried out at a heating temperature of generally 250 to 300° C. Since the light diffusing polycarbonate resin composition has significantly improved resin fluidity and improved stability during the residence thereof in an injection molding device or the like molding device, it is possible to form by injection molding a light diffusing plate for LCD having a size of 20 inches or more. In particular, it is possible to solve the problems of conventional light diffusing plates of an acrylic resin, such as lack of heat resistance or anti-hygroscopicity and a warp of a large size plate, and to provide a thin (2 mm), large area light diffusing plate of a polycarbonate resin having excellent heat resistance and anti-hygroscopicity.

The light diffusing plate can be suitably used in the field of liquid crystal displays, for applications for optical elements and as substitutes for glass. Examples of the optical elements include optical lens, light guide plates (light guides) and light diffusing plates. Examples of the substitutes for glass include street lamp covers and laminated glass for vehicles or construction materials.

EXAMPLES

The present invention will be next described in more detail by way of examples but is not limited thereto in any way.

Preparation Example

Preparation of Polycarbonate Copolymer

Polycarbonate copolymers were prepared as follows.

Synthesis of Polytetramethylene Glycol Bis(4-hydroxybenzoate):

In the atmosphere of nitrogen, 100 parts by mass of polytetramethylene glycol (PTMG, Mn=2,000) and 16.7 parts by mass of methyl p-hydroxybenzoate were heated at 210° C. in the presence of 0.5 part by weight of dibutyltin oxide while distilling produced methanol.

The reaction system was then evacuated to distil off excess methyl p-hydroxybenzoate. The reaction product was dissolved in methylene chloride. An aqueous 8% by mass sodium hydrogen carbonate solution was added to the methylene chloride solution and vigorously mixed therewith for 20 minutes. The methylene chloride phase was collected by centrifuge and concentrated under vacuo to obtain polytetramethylene glycol bis(4-hydroxybenzoate). The product was subjected to high speed liquid chromatography (HPLC) to quantitatively analyze p-hydroxybenzoic acid and methyl p-hydroxybenzoate. As a result it was found that the contents of p-hydroxybenzoic acid and methyl p-hydroxybenzoate were 10 ppm by mass or less and 0.2% by mass, respectively.

The HPLC measurement was carried out by the following method. An ODS-3 column manufactured by GL Science Inc. was used. Using a 1:2 mixed solvent of an aqueous 0.5% phosphoric acid solution with acetonitrile, the measurement was performed under conditions involving a column temperature of 40° C. and a flow rate of 1.0 mL/min. The contents were determined based on calibration curves of standard samples.

Preparation of Polycarbonate Oligomer Solution:

To a 5.6% by mass aqueous solution of sodium hydroxide was added sodium dithionite in an amount of 2,000 ppm with respect to bisphenol A (BPA) to be dissolved in the succeeding step. To this mixture, BPA was dissolved so that the BPA concentration was 13.5% by mass, thereby obtaining an aqueous sodium hydroxide solution containing BPA. The above aqueous sodium hydroxide solution containing BPA, methylene chloride, and phosgene were continuously passed at flow rates of 40 L/hr, 15 L/hr and 4.0 kg/hr, respectively, through a tubular reactor having an inside diameter of 6 mm and a tube length of 30 m. The tubular reactor had a jacket through which cooling water was passed to maintain the temperature of the reaction solution at 40° C. or below. The reaction solution discharged from the tubular reactor was continuously introduced into a tank reactor having an inside volume of 40 L and equipped with sweptback blades and baffles, to which were further fed an aqueous sodium hydroxide solution containing BPA at a feed rate of 2.8 L/hr, a 25% by mass aqueous sodium hydroxide solution at a feed rate of 0.07 L/hr, water at a feed rate of 17 L/hr and a 1% by mass aqueous triethylamine solution at a feed rate of 0.64 L/hr. The mixture in the tank reactor was reacted. The reaction solution was continuously withdrawn from the tank reactor and was allowed to quiescently stand to separate and remove a water phase, thereby collecting a methylene chloride phase.

Thus obtained polycarbonate oligomer solution had a polycarbonate oligomer concentration of 329 g/L and a chloroformate group concentration of 0.74 mol/L.

Preparation of PCC1:

In a 50 L tank reactor equipped with baffle plates, paddle-type stirring propellers and a cooling jacket, 15 L of the above-described polycarbonate oligomer solution, 8.6 L of methylene chloride, 325 g of the above-described polytetramethylene glycol bis(4-hydroxybenzoate) (average molecular weight of PTMG chain: 2,000) and 8.5 mL of triethylamine were charged. To this mixture, 2,673 g of a 6.4% by mass aqueous sodium hydroxide solution was added with stirring to react the polycarbonate oligomer with polytetramethylene glycol bis(4-hydroxybenzoate) for 10 minutes.

To the resulting polymerization liquid were then added a methylene chloride solution of p-t-butylphenol (PTBP) (obtained by dissolving 110 g of PTBP in 1.0 L of methylene chloride) and an aqueous sodium hydroxide solution containing BPA (obtained by dissolving 862 g of BPA in an aqueous solution of 518 g of NaOH and 1.7 g of sodium dithionite dissolved in 7.6 L of water). The resulting mixture was polymerized for 30 minutes.

The reaction liquid was diluted with 15 L of methylene chloride and stirred for 10 minutes. Then the reaction liquid was separated into an organic phase containing a polycarbonate and an aqueous phase containing excess BPA and NaOH. The organic phase was collected.

The thus collected methylene chloride solution of the polycarbonate was washed successively with an aqueous 0.03 mol/L NaOH solution and with 0.2 N hydrochloric acid each in an amount of 15% by volume based on the methylene chloride solution. The resulting methylene chloride solution was thereafter repeatedly washed with pure water until the electric conductivity of the aqueous phase after the washing became 0.01 μS/m or less.

The washed methylene chloride solution of the polycarbonate was concentrated and the solids were pulverized to obtain flakes. The flakes were dried at 100° C. under vacuum.

The NMR analysis of the product revealed that the amount of polytetramethylene glycol bis(4-hydroxybenzoate) units was 5.0% by mass.

The viscosity value as measured in accordance with ISO 1628-4 (1999) was 39.7.

Preparation of PCC2:

In a 50 L tank reactor equipped with baffle plates, paddle-type stirring propellers and a cooling jacket, 15 L of the above-described polycarbonate oligomer solution, 8.6 L of methylene chloride, 650 g of the above-described polytetramethylene glycol bis(4-hydroxybenzoate) (average molecular weight of PTMG chain: 2,000) and 8.5 mL of triethylamine were charged. To this mixture, 2,673 g of a 6.4% by mass aqueous sodium hydroxide solution was added with stirring to react the polycarbonate oligomer with polytetramethylene glycol bis(4-hydroxybenzoate) for 10 minutes.

To the resulting polymerization liquid were then added a methylene chloride solution of PTBP (obtained by dissolving 145 g of PTBP in 1.0 L of methylene chloride) and an aqueous sodium hydroxide solution containing BPA (obtained by dissolving 862 g of BPA in an aqueous solution of 518 g of NaOH and 1.7 g of sodium dithionite dissolved in 7.6 L of water). The resulting mixture was polymerized for 30 minutes.

The reaction liquid was diluted with 15 L of methylene chloride and stirred for 10 minutes. Then the reaction liquid was separated into an organic phase containing a polycarbonate and an aqueous phase containing excess BPA and NaOH. The organic phase was collected.

The thus collected methylene chloride solution of a polycarbonate was washed successively with an aqueous 0.03 mol/L NaOH solution and with 0.2 N hydrochloric acid each in an amount of 15% by volume based on the methylene chloride solution. The resulting methylene chloride solution was thereafter repeatedly washed with pure water until the electric conductivity of the aqueous phase after the washing became 0.01 μS/m or less.

The washed methylene chloride solution of the polycarbonate was concentrated and the solids were pulverized to obtain flakes. The flakes were dried at 100° C. under vacuum.

The NMR analysis of the product revealed that the amount of polytetramethylene glycol bis(4-hydroxybenzoate) units was 10.7% by mass.

The viscosity value as measured in accordance with ISO 1628-4 (1999) was 34.5.

Measurement of Copolymerized Units:

The copolymer was measured for $^1$H-NMR. The proton (underlined) signals were assigned as follows:

δ1.4-1.9: $C\underline{H}_3$ of BPA, —O—$CH_2$—$C\underline{H}_2$—$C\underline{H}_2$—$CH_2$—

δ3.3-3.5: —O—$C\underline{H}_2$—$CH_2$—$CH_2$—$C\underline{H}_2$—

δ4.3-4.4: —CO—O—$C\underline{H}_2$—$CH_2$—$CH_2$—$CH_2$—

From respective integration values, the molar proportions of the phenol-modified diol carbonate units represented by the general formula (II) and the BPA carbonate units represented by the general formula (I) were calculated according to the calculation formulas shown below. Thereafter, the molar proportions were converted into weight percentages. As a result, the amount of the phenol-modified diol carbonate units of the formula (II) copolymerized with the BPA carbonate units of the general formula (I) was calculated to be 10.7% by mass.

Calculation Formulas:

The calculation formulas are as follows.

When the integration of proton signals at δ1.4-1.9, δ3.3-3.5 and δ4.3-4.4 are 929.5, 179.5 and 5.9, respectively, the repeating number n is given as:

$$n=179.5\div5.9+1=31.4.$$

The BPA and phenol-modified diol fractions are given as:

$$BPA=(929.5-179.5-5.9)\div6=124.0$$

$$\text{Phenol-modified diol}=5.9\div4=1.475.$$

The molar proportion of the BPA carbonate units is calculated to be 98.8 mol % as follows:

$$[(929.5-179.5-5.9)\div6]\div\{(5.9\div4)+[(929.5-179.5-5.9)\div6]\}\times100=98.8 \text{ mol \%},$$

while the molar proportion of the phenol-modified diol carbonate units is calculated to be 1.18 mol % as follows:

$$(5.9\div4)\div\{(5.9\div4)+[(929.5-179.5-5.9)\div6]\}\times100=1.18 \text{ mol \%}.$$

The amount (in terms of % by mass) of the phenol-modified diol carbonate units in the copolymer is calculated to be 10.7% by mass as follows:

$$1.18\times(136+120+31.4\times72+12+16)\div[1.18\times(136+120+31.4\times72+12+16)+98.8\times254]\times100=10.7\% \text{ by mass}$$

Examples 1 to 9 and Comparative Examples 1 and 2

The components shown below were used in Examples and Comparative Examples. Respective components were fed, in the compounding proportions shown in Table 1, to a single-screw extruder (Model VS-40 manufactured by Taguchi Plastic Machine Co., Ltd.) having a diameter of 40 mm and kneaded and pelletized at a kneading temperature of 280° C. and a screw revolution of 100 rpm.

In Table 1, the % by mass is based on the aromatic PC resin.

Compounding Components:

(A) Aromatic PC Resin

PCC1: Polycarbonate copolymer prepared in the above Preparation Example (PTMG content: 5% by mass)

PCC2: Polycarbonate copolymer prepared in the above Preparation Example (PTMG content: 10.7% by mass)

PC1: Polycarbonate polymer, TAFLON FN1500 [Trade name, manufactured by Idemitsu Kosan Co., Ltd., viscosity average molecular weight: 14,500, refractive index: 1.585]

(B) Light Diffusing Agent

MBX20: Cross-linked acrylic resin beads [Trade name, manufactured by Sekisui Plastics Co., Ltd., average particle diameter 20 μm]

KMP590: Silicone resin particles [Trade name, manufactured by Shinetsu Silicone Co., Ltd., average particle diameter: 2 μm]

(C) Thermoplastic Polymethyl Methacrylate Resin

BR-83: Polymethyl methacrylate (PMMA), DIANAL BR-83 [Trade name, manufactured by Mitsubishi Rayon Co., Ltd., viscosity average molecular weight: 40000]

(D) Phosphorus-Based Stabilizer

JC-263: Triphenylphosphine [Trade name, manufactured by Johoku Chemicals Co., Ltd.]

(E) Organopolysiloxane

KR511: Organopolysiloxane compound having phenyl groups, vinyl groups, and methoxy groups [Trade name, manufactured by Shin-Etsu Chemical Co., Ltd., refractive index 1.518]

(F) UV Absorbing agent

HOSTAVIN B-CAP: Malonic acid ester-type UV absorbing agent [Trade name, manufactured by Clariant Corp.]

Sanduvor VSU: Oxalyl anilide UV absorbing agent [Trade name, manufactured by Clariant Corp.]

HOSTAVIN RP-25: Malonic acid ester-type UV absorbing agent [Trade name, manufactured by Clariant Corp.]

ULS1635: Benzotriazol-type UV absorbing agent [Trade name, manufactured by Ipposha Oil Industries Co., Ltd.]

(G) Alicyclic Epoxy Compound

2021P: CELLOXDE 2021P [Trade name, manufactured by Daicel Chemical Industries, Ltd., compound of Formula (V)]

TABLE 1

| | (A) Aromatic PC resin | | | | PTMG Content in (A) (% by mass) | (B) Diffusing agent | | (C) Thermoplastic Acrylic resin | |
|---|---|---|---|---|---|---|---|---|---|
| | Kind | Amount (% by mass) | Kind | Amount (% by mass) | | Kind | Amount (% by mass) | Kind | Amount (% by mass) |
| Ex. 1 | PCC1 | 100 | | | 5 | MBX 20 | 5 | — | — |
| Ex. 2 | PCC1 | 100 | | | 5 | MBX 20 | 5 | BR83 | 0.1 |
| Ex. 3 | PCC1 | 100 | | | 5 | MBX 20 | 5 | BR83 | 0.1 |
| Ex. 4 | PCC1 | 100 | | | 5 | MBX 20 | 5 | BR83 | 0.1 |
| Ex. 5 | PCC1 | 100 | | | 5 | KMP 590 | 0.9 | BR83 | 0.1 |
| Ex. 6 | PCC1 | 100 | | | 5 | KMP 590 | 0.9 | BR83 | 0.1 |
| Ex. 7 | PCC1 | 100 | | | 5 | KMP 590 | 0.9 | BR83 | 0.1 |
| Ex. 8 | PCC1 | 100 | | | 5 | KMP 590 | 0.9 | BR83 | 0.1 |
| Ex. 9 | PCC2 | 30 | PC1 | 70 | 3 | KMP 590 | 0.9 | BR83 | 0.1 |
| Com. Ex. 1 | | | PC1 | 100 | — | MBX 20 | 5 | — | — |
| Com. Ex. 2 | | | PC1 | 100 | — | KMP 590 | 0.9 | — | — |

| | (E) Organo-polysiloxane | | (G) Alicyclic epoxy compound | | (F) UV absorbing agent | | (D) Phosphorus-based stabilizer | |
|---|---|---|---|---|---|---|---|---|
| | Kind | Amount (% by mass) | Kind | Amount (% by mass) | Kind | Amount (% by mass) | Kind | Amount (% by mass) |
| Ex. 1 | — | — | — | — | — | — | — | — |
| Ex. 2 | — | — | — | — | — | — | — | — |
| Ex. 3 | KR 511 | 0.1 | — | — | — | — | JC 263 | 0.3 |
| Ex. 4 | KR 511 | 0.1 | 2021P | 0.05 | HOSTAVIN B-CAP | 0.3 | JC 263 | 0.3 |
| Ex. 5 | KR 511 | 0.1 | 2021P | 0.05 | HOSTAVIN B-CAP | 0.3 | JC 263 | 0.3 |
| Ex. 6 | KR 511 | 0.1 | — | — | HOSTAVIN RP-25 | 0.3 | JC 263 | 0.3 |
| Ex. 7 | KR 511 | 0.1 | — | — | Sanduvor VSU | 0.3 | JC 263 | 0.3 |
| Ex. 8 | KR 511 | 0.1 | — | — | ULS1635 | 0.3 | JC 263 | 0.3 |
| Ex. 9 | KR 511 | 0.1 | — | — | HOSTAVIN B-CAP | 0.3 | JC 263 | 0.3 |

TABLE 1-continued

| Com. Ex. 1 | — | — | — | — | — | — | — | — |
| Com. Ex. 2 | — | — | — | — | — | — | — | — |

To evaluate the fluidity, the obtained pellets were measured for their flow value (Q value) and spiral flow length (SFL value) in accordance with the method described below.

To evaluate the moldability, the obtained pellets were molded in to a light diffusing plate having a size of 32 inches (81.3 cm) and a thickness of 2 mm at a molding temperature of 280° C. using 650 ton injection molding machine (model MD650AP, manufactured by Niigata Machine Techno Co., Ltd.).

Further, to evaluate the hue and light resistance, the obtained pellets were molded in to a test sample plate having a size of 140 mm×140 mm and a thickness of 2 mm at a molding temperature of 300° C. using 40 ton injection molding machine (model EC40N, manufactured by Toshiba Kikai Co., Ltd.). The test sample plate was measured for light transmittance, haze, YI and light resistance.

The following methods were adopted to evaluate respective properties.

(1) Fluidity

Q value: Using a Koka type flow tester, an amount of a molten resin (mL/sec) discharged from a nozzle having a diameter of 1 mm and a length of 10 mm at a temperature of 280° C. and under a pressure of 15.7 MPa was measured in accordance with JIS K7210. The flow value (Q value) increases with a decrease of the melt viscosity.

SFL: SFL was evaluated using an injection molding temperature of 280° C., a mold temperature of 80° C. and a thickness of 2 mm.

(2) Moldability

The moldability was judged as being acceptable (○) when the common difference in thickness of the light diffusing plate (32 inches, 2 mm) produced by injection molding under the above-described conditions was within ±100 μm.

(3) Transmittance

Transmittance was measured in accordance with the method specified in JIS K7105.

(4) Haze

Haze was measured in accordance with the method specified in JIS K7105.

(5) Evaluation of Hue (YI)

Using a spectrophotometer (LCM2020 Plus, manufactured by Gretag Macbeth Inc.) YI, chromaticity (x, y) and transmittance of 400 nm light were measured with a light source of F and a field of view of 10 degrees.

(6) Light Resistance Test

Using a light resistance test machine (UVCON UC-1 manufactured by Atlas Co., Ltd.), a sample was irradiated for 24 hours at 65° C. using a fluorescent UV lamp as a light source. A color difference ΔE after the irradiation was measured.

The light diffusing plate produced in each of Examples had an appearance free of burns or gases (bubbles) and shows a common difference in thickness within ±100 μm.

(7) Stability During Residence Test (ΔYI)

A difference in YI between a color plate obtained by molding without residing in the 40 ton injection molding machine and a color plate obtained by molding with residing therein for 15 minutes was measured using a spectrophotometer (LCM2020 Plus, manufactured by Gretag Macbeth Inc.) with a C light source.

TABLE 2

| | Q value | SFL (mm) | Moldability (32 in) | Transmittance (%, 2 mm) | Haze (%, 2 mm) | YI (F light source) | Transmittance %, 400 nm | Light resistance (24 hr irradiation) ΔE |
|---|---|---|---|---|---|---|---|---|
| Example 1 | 72 | 500 | ○ | 66.0 | 93.2 | 68.0 | 48 | 2.5 |
| Example 2 | 72 | 500 | ○ | 67.0 | 93.2 | 67.5 | 49 | 2.4 |
| Example 3 | 72 | 500 | ○ | 67.5 | 93.2 | 67.0 | 49 | 2.4 |
| Example 4 | 72 | 500 | ○ | 67.0 | 93.2 | 68.0 | 48 | 0.02 |
| Example 5 | 69 | 480 | ○ | 57.0 | 93.4 | 60.0 | 34 | 0.02 |
| Example 6 | 69 | 480 | ○ | 57.0 | 93.4 | 60.5 | 34 | 0.03 |
| Example 7 | 69 | 480 | ○ | 57.0 | 93.4 | 61.0 | 33 | 0.04 |
| Example 8 | 69 | 480 | ○ | 56.0 | 93.4 | 62.0 | 30 | 0.05 |
| Example 9 | 65 | 450 | ○ | 57.0 | 93.4 | 60.0 | 34 | 0.02 |
| Comp. Example 1 | 30 | 310 | x | 64.0 | 94.0 | 68.0 | 48 | 2.5 |
| Comp. Example 2 | 28 | 300 | x | 55.0 | 94.5 | 62.0 | 34 | 2.4 |

INDUSTRIAL APPLICABILITY

The light diffusing polycarbonate resin composition according to the present invention has improved fluidity, excellent heat resistance and dimensional stability, provides bright luminance and reduced yellowish tint and, therefore, is suited for forming a light diffusing plate for liquid crystal displays having a relatively large size of 20 inches or more. Further, the light diffusing polycarbonate resin composition is suitably utilizable as optical elements such as optical lens, light guide plates (light guides) and light diffusing plates and as substitutes for glass such as street lamp covers and laminated glass for vehicles or construction materials.

The invention claimed is:

1. A light diffusing polycarbonate resin composition comprising (A) a polycarbonate resin comprising a polycarbonate copolymer which comprises a repeating unit represented by the general formula (I) shown below and a repeating unit represented by the general formula (II) shown below, which has a content of the repeating units of the general formula (II) of 1 to 30% by mass and which has a viscosity value of 30 to 71; and (B) a light diffusing agent compounded therein in an amount of 0.01 to 10 parts by mass per 100 parts by mass of the polycarbonate resin,

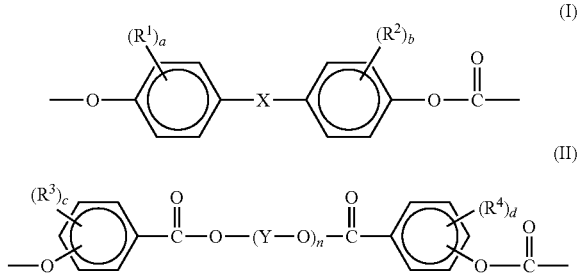

wherein $R^1$ and $R^2$ each independently represent an alkyl group having 1 to 6 carbon atoms, X represents a direct bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— or a linkage represented by the following formula (III-1) or (III-2):

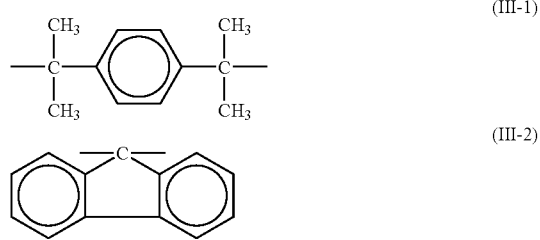

$R^3$ and $R^4$ each independently represent an alkyl group having 1 to 3 carbon atoms, Y represents a straight chained or branched chained alkylene group having 2 to 15 carbon atoms, n is an integer of 2 to 200 and a, b, c and d are each an integer of 0 to 4.

2. The light diffusing polycarbonate resin composition according to claim 1, wherein Y is at least one member selected from the group consisting of —CH$_2$—CH$_2$—CH$_2$—CH$_2$—, —CH$_2$—CH$_2$—CH$_2$—CH(CH$_3$)—, —CH$_2$—CH$_2$—CH$_2$— and mixtures thereof.

3. The light diffusing polycarbonate resin composition according to claim 1, further comprising 0.01 to 5 parts by mass of (C) a thermoplastic acrylic resin.

4. The light diffusing polycarbonate resin composition according to claim 1, further comprising 0.001 to 1 part by mass of (D) a phosphorus-containing stabilizer.

5. The light diffusing polycarbonate resin composition according to claim 1, further comprising 0.01 to 1 part by mass of (E) an organopolysiloxane.

6. The light diffusing polycarbonate resin composition according to claim 5, wherein the organisiloxane (E) has a refractive index which does not differ by more than 0.1 from that of the component (A).

7. The light diffusing polycarbonate resin composition according to claim 1, further comprising 0.05 to 5 parts by mass of (F) a UV absorbing agent.

8. The light diffusing polycarbonate resin composition according to claim 1, further comprising 0.001 to 1 part by mass of (G) an alicyclic epoxy compound.

9. The light diffusing polycarbonate resin composition according to claim 3, wherein (C) the thermoplastic acrylic resin has a viscosity average molecular weight of 1,000 to 200,000.

10. The light diffusing polycarbonate resin composition according to claim 1, wherein the component (B) is at least one member selected from the group consisting of crosslinked polymethyl methacrylate resin particles, silicone resin particles, polyorganosilsesquioxane particles, silica particles, quartz particles, silica fibers, quartz fibers, glass fibers and mixtures of two or more thereof.

11. The light diffusing polycarbonate resin composition according to claim 1, wherein the component (B) has an average particle diameter of 1 to 200 μm.

12. The light diffusing polycarbonate resin composition according to claim 7, wherein the component (F) is a light resisting agent having a LTV absorption spectrum with a maximum absorption wavelength of 290 to 330 nm.

13. A light diffusing plate having a thickness of 0.5 to 3 mm and is obtained by molding a light diffusing polycarbonate resin composition according to claim 1.

* * * * *